(12) United States Patent
Yoshida et al.

(10) Patent No.: US 10,724,767 B2
(45) Date of Patent: Jul. 28, 2020

(54) HIGH-PRESSURE HYDROGEN FILLING SYSTEM WITH EXPANSION TURBINE

(71) Applicant: HITACHI PLANT MECHANICS CO., LTD., Kudamatsu-shi, Yamaguchi (JP)

(72) Inventors: Jun Yoshida, Kudamatsu (JP); Tsuyoshi Takahashi, Kudamatsu (JP); Yukihiro Mimaki, Kudamatsu (JP); Masanori Monde, Saga (JP)

(73) Assignee: HITACHI PLANT MECHANICS CO., LTD., Kudamatsu (JP)

( * ) Notice: Subject to any disclaimer, the term of this patent is extended or adjusted under 35 U.S.C. 154(b) by 83 days.

(21) Appl. No.: 16/307,555

(22) PCT Filed: Jun. 30, 2017

(86) PCT No.: PCT/JP2017/024116
§ 371 (c)(1),
(2) Date: Dec. 6, 2018

(87) PCT Pub. No.: WO2018/012320
PCT Pub. Date: Jan. 18, 2018

(65) Prior Publication Data
US 2019/0301774 A1 Oct. 3, 2019

(30) Foreign Application Priority Data

Jul. 14, 2016 (JP) ................. 2016-139250

(51) Int. Cl.
*F25B 9/06* (2006.01)
*F02C 1/02* (2006.01)
*F17C 5/06* (2006.01)
*F17C 11/00* (2006.01)

(52) U.S. Cl.
CPC .............. *F25B 9/06* (2013.01); *F02C 1/02* (2013.01); *F17C 5/06* (2013.01); *F17C 11/005* (2013.01);

(Continued)

(58) Field of Classification Search
CPC ...... F25B 9/06; F02C 1/02; F17C 5/06; F17C 11/005; F17C 2221/012; F17C 2227/0128;

(Continued)

(56) References Cited

U.S. PATENT DOCUMENTS 8,991,445 B2 * 3/2015 Nakazawa ........ H01M 8/04201
141/197
2007/0227614 A1 * 10/2007 Kurita ....................... B60S 5/02
141/26

(Continued)

FOREIGN PATENT DOCUMENTS

JP 2004-116619 A 4/2004
JP 2008-215505 A 9/2008

(Continued)

OTHER PUBLICATIONS

Aug. 15, 2017 International Search Report issued in International Patent Application No. PCT/JP2017/024116.

*Primary Examiner* — Emmanuel E Duke
(74) *Attorney, Agent, or Firm* — Oliff PLC (57) ABSTRACT

A high-pressure hydrogen filling system with expansion turbine having a simple configuration, requiring less maintenance and control duties, capable of being operated at low costs including electric power consumption cost, and allowing the use of general-purpose materials for composing the components of a hydrogen gas supply unit, a cold accumulator is installed at the outlet of an expansion turbine in a system performing hydrogen gas enthalpy drop when pressurizing and filling highly-pressurized and accumulated hydrogen gas into a tank.

6 Claims, 9 Drawing Sheets

(52) U.S. Cl.
CPC ............... *F17C 2221/012* (2013.01); *F17C 2227/0128* (2013.01); *F17C 2260/023* (2013.01); *F17C 2270/0139* (2013.01); *F17C 2270/0168* (2013.01); *Y02E 60/321* (2013.01)

(58) Field of Classification Search
CPC ........ F17C 2260/023; F17C 2270/0139; F17C 2270/0168; F17C 2227/0362; F17C 2265/065; F17C 2227/0325; F17C 2270/0178; F17C 2223/0123; F17C 2227/0157; F17C 2223/036; F17C 2227/0337; Y02E 60/321; F28D 20/0056
See application file for complete search history.

(56) References Cited

U.S. PATENT DOCUMENTS

| | | | |
|---|---|---|---|
| 2010/0193070 A1* | 8/2010 | Allidieres | F17C 5/06 141/11 |
| 2010/0219066 A1* | 9/2010 | Takeuchi | H01M 8/0656 204/242 |
| 2012/0216915 A1* | 8/2012 | Takata | F17C 5/06 141/82 |
| 2014/0102587 A1* | 4/2014 | Nagura | B60L 58/40 141/69 |
| 2014/0332114 A1* | 11/2014 | Nagura | F17C 13/025 141/4 |
| 2015/0136351 A1* | 5/2015 | Reznik | F01K 3/12 165/10 |
| 2015/0167895 A1* | 6/2015 | Nagura | F17C 5/007 141/4 |

FOREIGN PATENT DOCUMENTS

| | | |
|---|---|---|
| JP | 2010-032053 A | 2/2010 |
| JP | 2016-032072 A | 3/2016 |

* cited by examiner

HIGH-PRESSURE HYDROGEN FILLING SYSTEM WITH EXPANSION TURBINE

TECHNICAL FIELD

The present invention relates to an expansion turbine system for filling high-pressure hydrogen applicable to a temperature lowering system technology such as precooling function in the final filling section of a hydrogen filling system (hereinafter may be referred to as "a hydrogen station") for filling hydrogen gas as fuel from a hydrogen gas supply source into a fuel tank of a hydrogen vehicle such as a fuel cell vehicle (hereinafter may be referred to as "hydrogen vehicle").

BACKGROUND ART

When hydrogen gas to be used as fuel to a hydrogen vehicle is subjected to adiabatic expansion at a high pressure (isenthalpic expansion) in an expansion valve installed in a hydrogen gas filling line, the temperature of the hydrogen gas after the expansion rises by nature according to the Joule-Thomson effect because the expansion occurs at temperatures higher than the inversion temperature (−58° C.) owing to its nature. Therefore, when hydrogen gas as fuel to hydrogen vehicles is filled from a hydrogen gas supply source at a hydrogen station into a fuel tank of a hydrogen vehicle, the hydrogen gas temperature is increased in an expansion valve installed in the hydrogen gas filling line.

The higher the expansion ratio of hydrogen gas, the more the hydrogen gas temperature rise becomes noticeable. Therefore, if the supply gas pressure from the hydrogen gas supply source at a hydrogen station (supply source tank pressure) is increased, for example, if it is increased from 45 to 70 MPa (G), or further to 82 MPa (G), its own temperature rise increases accordingly.

Figure 1:
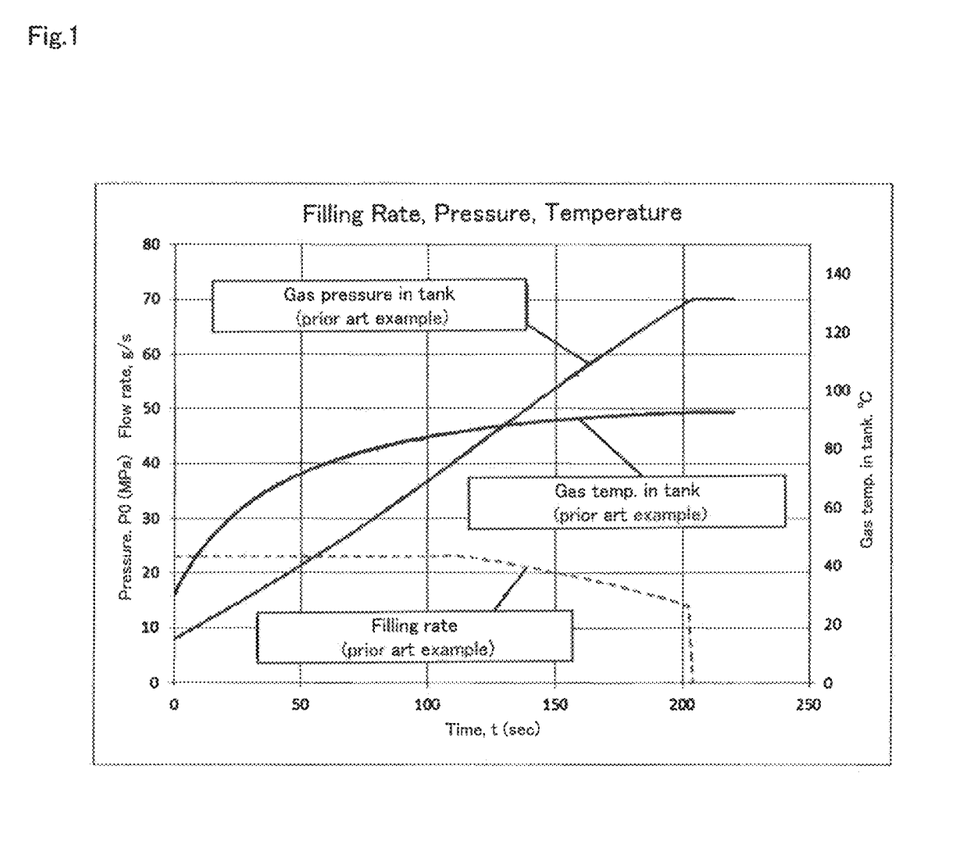
FIG. 1 A graph showing changes in the filling rate, pressure and temperature of hydrogen gas due to expansion by an expansion valve (valve expansion).

When the hydrogen gas from a supply source tank at a pressure 70 MPa (G), and 30° C., is expanded in one step, the gas temperature changes at the secondary pressure, as the respective changes are shown by way of example in FIG. 1.

In addition, when hydrogen gas is filled at a differential pressure into a closed space such as an onboard fuel tank of a vehicle, the temperature of the filled hydrogen gas in the fuel tank further rises on account of the compression of the gas at the time of the filling.

On the other hand, for a currently prevailing fuel cell vehicle, the highest temperature limit at hydrogen filling is set at 85° C. in consideration of the temperature limitation by fuel tank material as well as of temperature limitation by the operation of a fuel cell.

If hydrogen gas should be filled without any temperature control means, the temperature of the hydrogen gas at gas filling will rise above the highest temperature limit of 85° C., to cause the problems of temperature limitation by fuel tank material, temperature limitation by the operation of a fuel cell, and pressure drop due to cooling after filling, because of the nature of hydrogen as described above. In order to prevent such problems, a process of installing a cooling means, such as a thermocouple, in a hydrogen gas filling line and filling hydrogen gas in a hydrogen vehicle while cooling the hydrogen gas by means of the cooling means has been proposed and commercialized (see, e.g., Patent Document 1).

PATENT ART LITERATURE

Patent Literature

[Patent literature 1] Gazette No. JP 2004-116619 A

Outline of Invention

Problems to be Solved by the Invention

Figure 2:
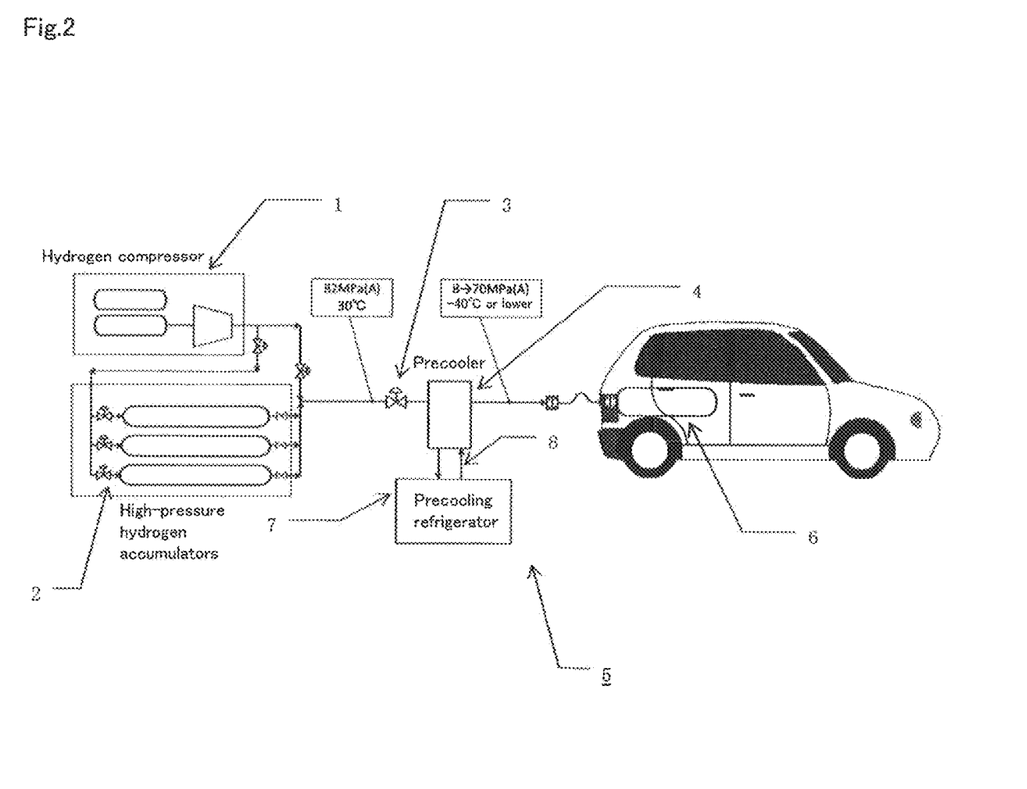
FIG. 2 An explanatory drawing of a hydrogen station employing a hydrogen precooling system of the prior art.

FIG. 2 illustrates the configuration of a typical 70 MPa (G) hydrogen station.

The hydrogen station is equipped with a compressing apparatus 1 comprising compressor unit for receiving hydrogen gas, a hydraulic hydrogen accumulating apparatus 2 comprising accumulator units for accumulating hydrogen gas from the compressing apparatus 1, an expansion valve 3 and hydrogen gas precooler 4 installed in the gas line for filling hydrogen gas from the hydraulic hydrogen accumulating apparatus 2 into a fuel tank 6 of a hydrogen vehicle, and a hydrogen precooling system 5 for cooling hydrogen gas by the medium of the hydrogen gas precooler 4, and the hydrogen precooling system 5 is equipped a refrigerating apparatus 7 comprising a compressor, condenser, expansion valve and accumulator and is equipped further with a brine circuit 8 comprising a brine tank, primary brine pump, and secondary brine tank.

The hydrogen received by the hydrogen station, both on-site type and off-site type, is compressed to an intermediate pressure (40 MPa (G) in the example of the Figure or to a high pressure (82 MPa (G) in the example of the Figure), and is retained in the form of compressed gas at the respective pressure in the accumulating units of the hydraulic hydrogen accumulating apparatus 2.

Filling the hydrogen gas into a demanding onboard fuel tank 6 of a vehicle is performed by expansion by the medium of the expansion valve 3. The expansion necessarily raises the hydrogen gas temperature, and therefore the gas is cooled down to −40° C. by the hydrogen precooling system 5 which is an external apparatus.

In the state of the art, the hydrogen precooling system 5 is the combination of a refrigerating system 7 of a usual type that uses freon, and the brine circuit 8 which is activated at around −40° C., and therefore has a complicated construction. Besides, it requires many rotary machines such as primary brine pump, secondary brine pump, and refrigerant compressor for refrigerator.

For the reason described above, hydrogen precooling systems used in the final filling section of known hydrogen stations to cool hydrogen gas have had problems as follows.

1) An external independent hydrogen precooling system is a system operable by electric power externally supplied. The power supply to typical hydrogen stations (300 Nm$^2$/h) is about 40 kW, a factor to increase hydrogen precooling system operating cost.

2) Because of freon (or freon substitute) used in the refrigerator, the system equipment and operation are subject to the refrigeration and safety rules and regulations under the High-Pressure Gas Safety Act.

3) For storing freon and brine within the station, measures must be taken to prevent freon and brine from leaking to outside environment.

4) The hydrogen precooling system is composed of two sections of a refrigerating circuit and a brine circuit and is therefore complicated, and has to have many rotary machines including refrigerant compressor and brine pumps. Therefore it requires many maintenance and control duties.

5) The system that uses brine necessarily takes a longer time until it comes to a steady operating condition after start. In order to minimize the time to reach a steady operating condition, it is necessary to steady the system by starting the hydrogen precooling system much earlier than the start of filling operation.

6) Minimizing the hydrogen station installation space is restricted by the space occupied by a hydrogen precooling system.

7) The current temperature −40° C. bottlenecks faster hydrogen filling. To shorten the filling time in future, precooling to lower than current −40° C. may be needed.

In view of the above-mentioned problems of the hydrogen precooling system employed to lower the hydrogen gas temperature in the final filling section of known hydrogen stations, the applicant of the present invention previously proposed a hydrogen precooling system of simple construction, operable at low operating costs including power consumption cost, and with lower maintenance and control duties, to be employed to lower hydrogen gas temperature in the final filling section of a hydrogen station, by Patent Application 2016-032072.

The hydrogen precooling system for lowering hydrogen gas temperature in the final filling section of a hydrogen station was intended to lower hydrogen gas temperature by an expander (expansion turbine) in the process of hydrogen gas expansion and pressure reduction and by utilizing the cooled heat energy, and could solve the problems involved in the hydrogen precooling system used to lower the hydrogen gas temperature in the final filling section of hydrogen stations of the prior art.

Figure 3:
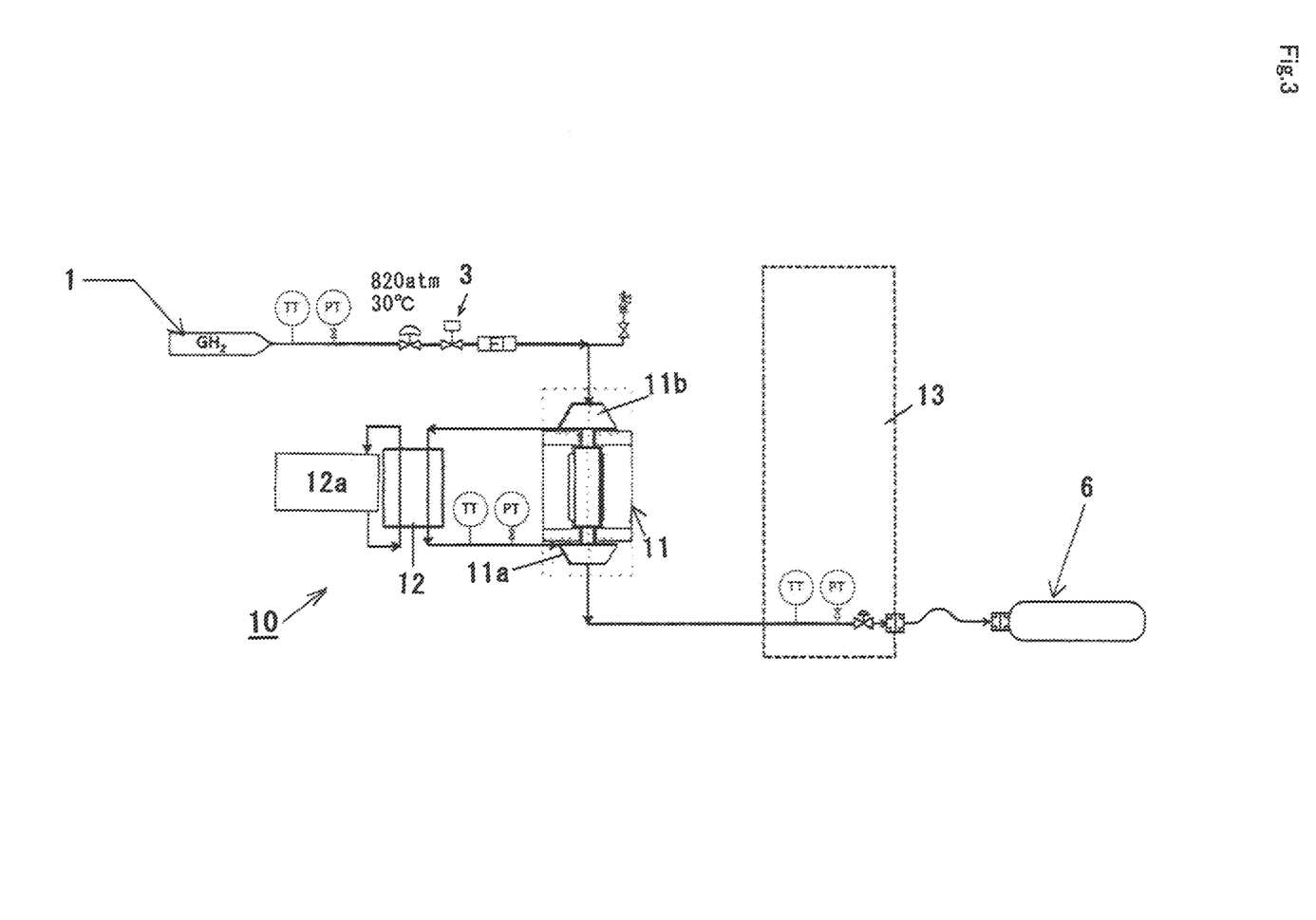
FIG. 3 An explanatory drawing showing an example of the high-pressure hydrogen filling system with expansion turbine of the new art.

More specifically, the hydrogen precooling system is so constructed as a high-pressure hydrogen gas filling system with expansion turbine 10, as illustrated in FIG. 3, that a hydrogen gas supply line 9 is connected to an expansion turbine 11 circuit, and that the hydrogen gas whose enthalpy (temperature) has been lowered by finally expanding the hydrogen gas by the expansion turbine 11 is filled into the fuel tank 6 of a hydrogen vehicle through the medium of a hydrogen gas supply unit 13.

The example of the configuration illustrated in FIG. 3 comprises an expansion turbine 11 in which a turbine 11a and a compressor 11b are coaxially arranged, but the configuration may comprise an expansion turbine only.

Figure 4:
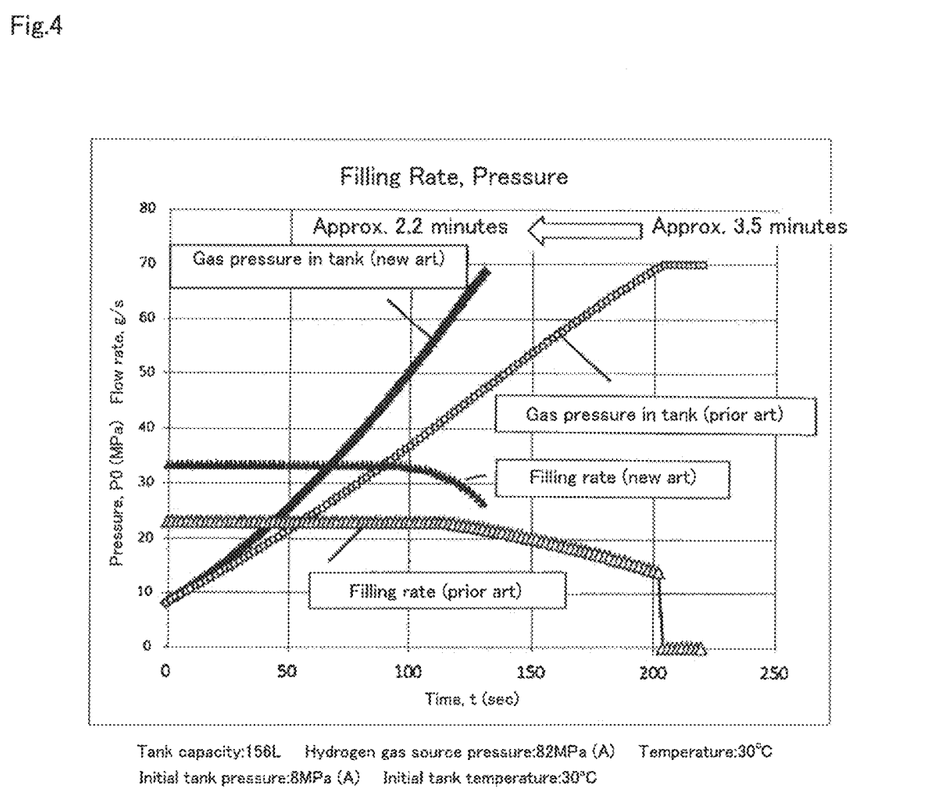
FIG. 4 A graph comparing changes in the filling rate and pressure between the expansion by a hydrogen gas expansion valve (valve expansion) (the prior art) and the high-pressure hydrogen filling system with expansion turbine (the new art).
Figure 5:
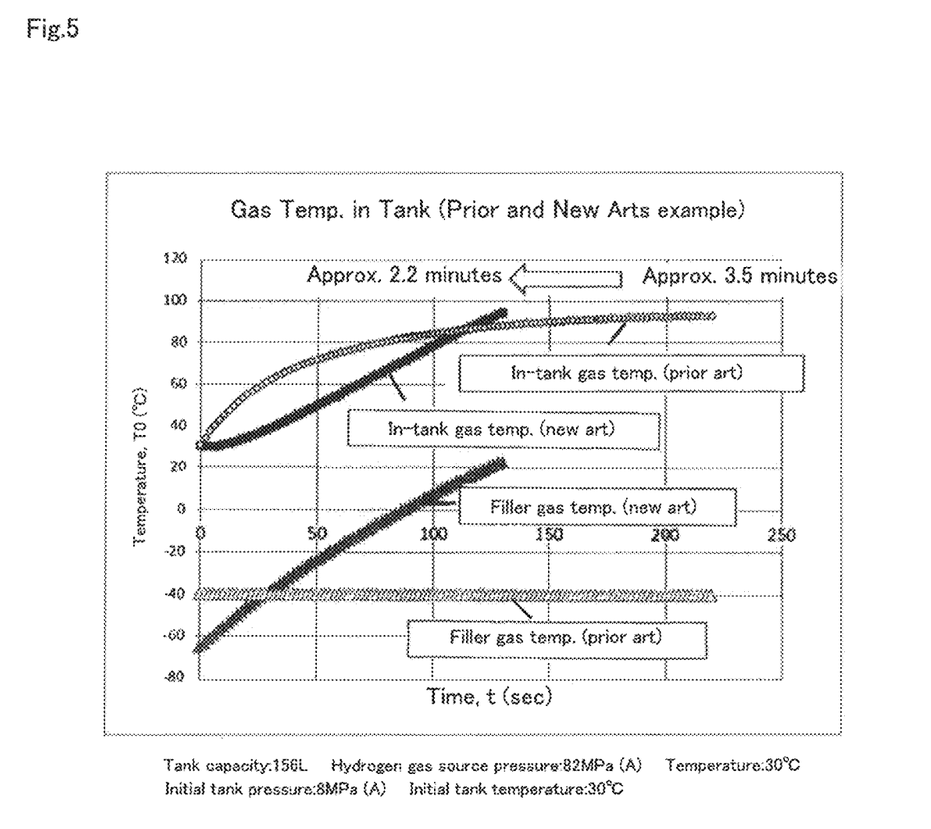
FIG. 5 A graph comparing changes in the temperature between the expansion by a hydrogen gas expansion valve (valve expansion) (the prior art) and the high-pressure hydrogen filling system with expansion turbine (the new art).

FIGS. 4 and 5 compare changes in the filling rate, pressure and temperature of hydrogen gas in between the system of expansion using a hydrogen gas expansion valve (valve expansion) (prior art) and the high-pressure hydrogen filling system using an expansion turbine (new art).

In the high-pressure hydrogen filling system with expansion turbine 10, the temperature at the outlet of the expansion turbine 11 is not constant but varies as the expansion ratio of the expansion turbine 11 varies with time.

As shown by the calculation examples of the temperatures at a typical turbine outlet (i.e., a filling tank inlet) in FIG. 5 (in which Tin (new art) shows an example of the behavior of expansion turbine 11 outlet (filling tank inlet) temperature in the high-pressure hydrogen filling system with expansion turbine 10), there arises in an early stage a region wherein the hydrogen gas temperature comes down, though temporally, to as low as about −70° C. on account of the high expansion ratio of the expansion turbine 11.

Considering the inevitable short period of time during which the hydrogen gas temperature drops to lower than −40° C., the hydrogen gas supply unit 13 components including, for example, a filling hose seal, were required to withstand −70° C. This posed a problem of equipment cost up. (Problem 8)

In view of the problems involved in the hydrogen precooling system used to lower hydrogen gas temperature in the final filling section of a hydrogen station based on the prior art, the purpose of the present invention is to provide a high-pressure hydrogen filling system with expansion turbine, having a simple construction, requiring less maintenance and control duties, operable at low costs including electric power consumption cost, and capable of comprising hydrogen gas supply unit components made of general-purpose materials.

Means for Solving the Problems

To achieve the purpose described above, the high-pressure hydrogen filling system with expansion turbine of the invention is characterized by a cold accumulator which is a pressure-resistant vessel containing and retaining cold accumulator elements and which is installed in a pipeline connected to the outlet of an expansion turbine in the hydrogen gas filling system for performing gas enthalpy reduction using an expansion turbine when the accumulated high-pressure hydrogen gas is pressurized and filled into a tank.

The said cold accumulator elements may be any of cold accumulators of metal ribbon and scrub brush shape.

The said expansion turbine may be a turbine compressor.

Effect of the Invention

The high-pressure hydrogen filling system with expansion turbine according to the present invention makes it possible to realize a system of simple configuration, requiring less maintenance and control duties, and operable at low operating costs including electric power consumption cost, by finally expanding hydrogen by an expansion turbine and by filling enthalpy-lowered (temperature-lowered) hydrogen gas into an adjust tank. For instance, a hydrogen precooling system can be provided for lowering hydrogen gas temperature in the final filling section of the hydrogen station.

Furthermore, by installing a cold accumulating apparatus, which is a pressure-resistant vessel containing and retaining cold accumulator elements such as metal elements of ribbon scrub brush shape, in the pipeline connected to the outlet of the expansion turbine, the degree of the hydrogen gas temperature drop in the initial gas filling stage, where the expansion ratio of the expansion turbine is otherwise high, can be mitigated and smoothed, to allow the use of general-purpose materials for the construction of a hydrogen gas supply unit and to prevent equipment cost rise.

If a turbine compressor, having an impeller for expansion at one end, and an impeller for compression at the other end, of its rotation shaft, is used to take the place of the said expansion turbine, the necessity of employing additional means for extracting expander-generated energy for effective energy utilization will be eliminated. In addition, the system allows to raise hydrogen gas pressure on the compressor side and to direct it to the turbine outlet for the benefit of increased expansion ratio of the turbine, commensurate with the pressure raised by the turbine, to eventually assure greater heat drop (i.e., generated cold).

FORM TO IMPLEMENT THE INVENTION

An embodiment of high-pressure hydrogen filling station with expansion turbine according to the invention is described below by referring to the accompanying drawings.

Figure 6:
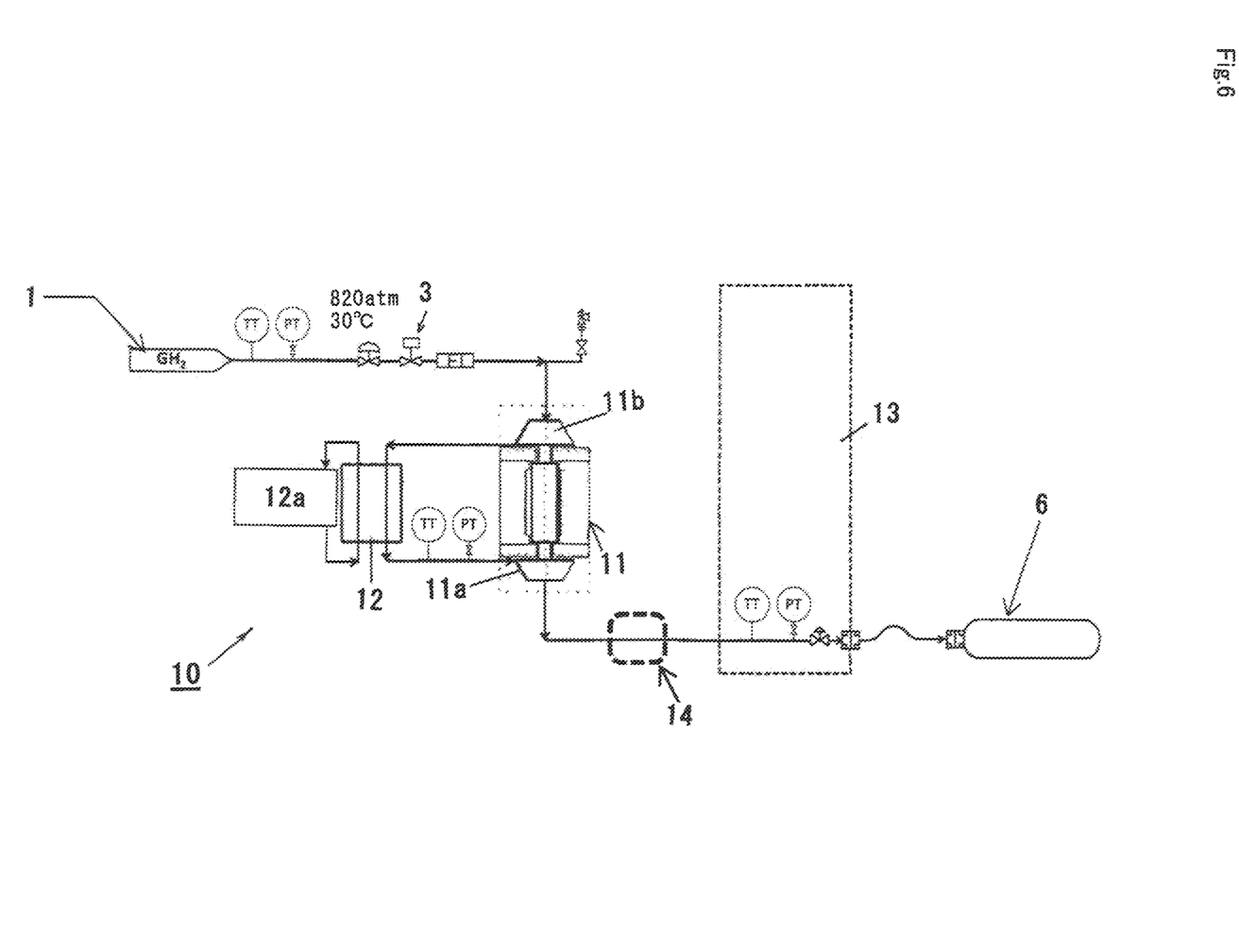
FIG. 6 An explanatory drawing showing an example of the high-pressure hydrogen filling system with expansion turbine of the present invention.

A high-pressure hydrogen filling station with expansion turbine is an application of the high-pressure hydrogen filling station with expansion turbine according to the present invention to a hydrogen precooling system used for lowering hydrogen gas temperature in the final filling section of the hydrogen station as shown in FIG. 6, and is arranged such that a cold accumulator 14 is installed at the outlet of an expansion turbine 11 in a filling system to perform hydrogen gas enthalpy lowering by using an expansion turbine 11 when pressure accumulated hydrogen gas at high pressure is pressurized and filled into a tank 6.

The expansion turbine 11 may be composed of only an expansion turbine, but, in the above-described embodiment, is composed of a turbine compressor having, for example, an impeller for expansion on one end, and an impeller for compression on the other end of the rotation shaft, which are generally used to perform compression and expansion of a refrigerant according to the prior art.

More specifically, the high-pressure hydrogen filling system with expansion turbine 10, like a final hydrogen gas expansion mechanism of a hydrogen station, as shown in FIG. 6, is made up of a hydrogen gas supply line 9 connected to the circuit of an expansion turbine 11, and is so composed as to fill hydrogen gas, finally expanded and enthalpy-reduced (temperature lowered) by the expansion turbine 11, into a fuel tank 6 of a hydrogen vehicle.

By equipping the expansion turbine 11 with a turbine 11a having an impeller for expansion on one end, and with a compressor 11b having an impeller for compression on the opposite end, of its rotation shaft, by arranging so as to raise hydrogen gas pressure on the compressor 11b side through the use of the rotation energy obtained on the turbine 11a side, and by directing the pressure-raised gas to the inlet of the turbine 11a (thus the hydrogen gas is supplied to the compressor 11b and then to the turbine 11a), the expansion ratio of the turbine 11a can be increased commensurate with the pressure increment gained by the compressor 11b, and greater heat drop (greater cold) can be obtained.

A cooler 12 may be installed at the inlet of the turbine 11a of the expansion turbine 11.

A cooling source 12a of the cooler 12 may preferably be of a water-cooling type or a chiller unit type.

A similar cooler, not shown in the drawing, may be installed at the inlet of the compressor 11b. When such a cooler is installed, the cooler 12 at the inlet of the turbine 11a may be omitted.

It can support the hydrogen gas temperature lowering.

FIGS. 4 and 5 show changes in the hydrogen gas filling rate, pressure and temperature in the expansion by an expansion valve (valve expansion) (prior art) and in the high-pressure filling system with expansion turbine (new art).

By applying the high-pressure filling system with expansion turbine 10 to a hydrogen precooling system used for lowering hydrogen gas temperature in the final filling section of a hydrogen station, it is possible to directly fill hydrogen gas, which is at a high pressure (82 MPa) (source pressure) from the hydrogen gas line 9, and which is expanded by the operation of the expansion turbine 11, into the fuel tank 6 of a hydrogen vehicle, using the pressure difference.

In this application, the difference between the source pressure and the pressure in the fuel tank 6 is large and therefore relatively high expansion ratios are available at the turbine 11a and at the compressor 11b. Consequently, greater cool can be generated.

As the gas filling goes on, the internal pressure of the fuel tank 6 keeps increasing while the cold generated by the expansion turbine 11 keeps decreasing, but the filling can be finished at not higher than 85° C.

The high-pressure filling system with expansion turbine 10, if operated without addition of any support, will have a region in which hydrogen gas temperature drops down to about −70° C., though for a short time, because of high expansion ratio of the expansion turbine 11 in an early stage of gas filling as shown in FIG. 5.

Therefore, in this embodiment of the high-pressure filling system with expansion turbine 10, a cold accumulator 14 is installed at the outlet of the expansion turbine 11.

Figure 7:
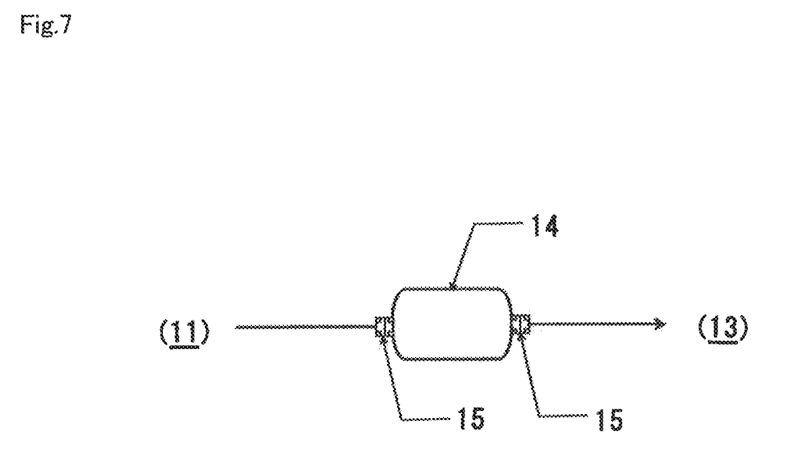
FIG. 7 An explanatory drawing showing the main part (cold accumulator) of the same.

The cold accumulator 14 is removable from the pipeline connected to the outlet of the expansion turbine 11 by the medium of joints 15.

This cold accumulator 14 is intended for allowing the use of low-temperature-resistant materials—materials not capable of withstanding −70° C., but general-purpose materials—for the construction of a hydrogen gas supply unit 13 components, such as a filling hose sealer, so that hydrogen gas temperature drop may be mitigated and smoothed, or more specifically operated at between −40° C. to −45° C., in an initial stage where the expansion ratio of the expansion turbine 11 is high, and it may particularly be a cold accumulator capable of withstanding low temperatures.

Figure 8:
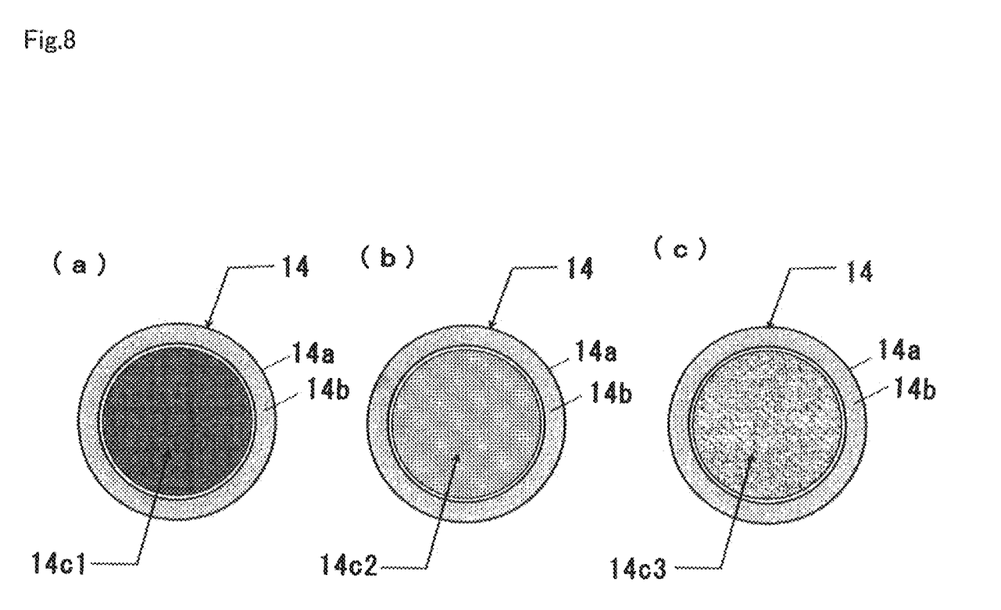
FIG. 8 A sectional view of the main part (cold accumulator) of the same.

As shown in FIG. 8, the cold accumulator 14 has a cylindrical structure comprising a pressure-resistant vessel 14a, and the vessel 14a is lined with heat insulation 14b to restrain external heat input and radiation as well as to hold a cold accumulator element 14c1 to 14c3 inside.

The cold accumulator element 14c1 to 14c3 may preferably be, though not particularly limited to, a metal honeycomb cold accumulator element 14c1 having a copper or stainless steel honeycomb structure as shown in FIG. 8 (a), a metal (ribbon scrub brush) insert-type cold accumulator element 14c2 having a copper or stainless steel ribbon scrub brush structure as shown in FIG. 8(b), or a cold accumulator element 14c3 containing filled-in alcohol beads (gels) as shown in FIG. 8(c) which is a cold accumulator element constituted of isopropyl alcohol beads or gels (that radiate or absorb heat in the form of solidification heat at a prescribed temperature, like, for example, "PlusICE" (trade name) manufactured by Phase Change Material Products Limited.

Among them, the metal honeycomb cold accumulator element 14c1 and the metal (ribbon scrub brush) insert cold accumulator element 14c2 can provide a high degree of filling density and gas/metal contact surface area because hydrogen gas can pass through structural voids of the metal elements and therefore the heat capacity of the elements can be fully used for the transfer of the accumulated cold energy.

The construction metal may be an ordinary metal such as copper or stainless steel as mentioned above but may also be a hydrogen storage alloy.

If a hydrogen storage alloy is used as the accumulator element metal, hydrogen is released in an early stage of operation of the expansion turbine 11 when the temperature and the pressure are low owing to the characteristics of hydrogen storage at high temperatures and hydrogen release at high temperatures, in addition to the effect of a cold accumulator element. As a result, hydrogen can be filled more efficiently. Also, in the last stage of an expansion turbine 11 operation, the temperature is relatively high, and the pressure is increased, so hydrogen storage takes place. Consequently, the release of gas from the pipeline on completion of the gas filling can be minimized, to enable not only temperature mitigation by the effect of cold accumulation, but efficient hydrogen filling as well.

Figure 9:
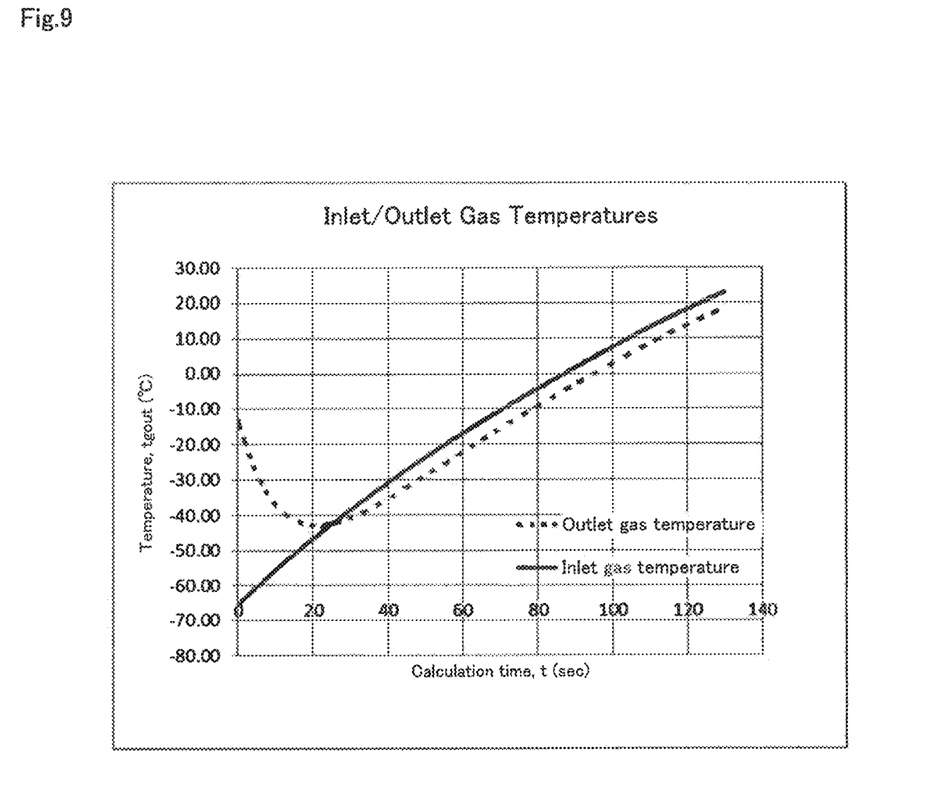
FIG. 9 A graph showing the effect of hydrogen gas temperature drop in an early stage of filling by the cold accumulator of the same.

Thus, a cold accumulator 14 is installed at the outlet of the expansion turbine 11, as show in FIG. 9, and hydrogen gas, whose temperature has been lowered to about −70° C. at the outlet of the expansion turbine 11 in an early stage of gas filling when the expansion ratio of the expansion turbine 11 is high, is led to run through the cold accumulator element 14, to store cold, and to be supplied at about −40° C. The cold energy stored in the cold accumulator 14 releases cold in the latter half of the filling process, that is, when the temperature at the outlet of the expansion turbine 11 rises, and thereby smoothes overall temperature behavior.

The application of the high-pressure hydrogen filling system with expansion turbine according to the present invention to a hydrogen precooling system used for lowering hydrogen gas temperature in the final filling section of a hydrogen station makes it feasible to solve the problems of a hydrogen precooling system used for lowering hydrogen gas temperature in the final filling section of a hydrogen station according to the prior art, as described below.

Concerning the Problem 1), external electric power supply is not required to the operation of the expansion turbine itself. In comparison with the operating cost (electric power cost) according to the prior art, little power supply is required.

Concerning the Problem 2), this system is individually free of cryogenic rules and regulations because no refrigerant is used. The system in its entirety can operate in compliance with the Safety Law.

Concerning the Problem 3), the system is free of freon refrigerant and brine, and is therefore free of risks of environmental accidents.

Concerning the Problem 4), the simplicity of the system construction assures significant low costs not only for operation but also for maintenance.

Concerning the Problem 5), temperature lowering begins to proceed simultaneously with the start of the expansion turbine operation, so the time constant in the system is very small. Prestarting time is short.

Concerning the Problem 6), only a cold box of the expansion turbine is needed, allowing to save space significantly. In volume percentage, it can be approx. 10 of that of the prior art.

Concerning the Problem 7), equipment flow rate can be easily increased, and a large fuel cell bus and track filling equipment without large precooler can be configured, by combining a plurality of expansion turbines together or by using an expansion turbine at an appropriate flow rate.

Concerning the Problem 8), the degree of hydrogen gas temperature drop in an early stage of gas filling where the expansion ratio of the expansion turbine is high can be mitigated and smoothed, to allow the use of general-purpose materials for the components of a hydrogen gas supply unit, and to serve to hold the equipment cost at a low level, by installing a cold accumulator at the outlet of the expansion turbine.

Furthermore, employing a turbine compressor for the expansion turbine can eliminate the necessity of providing additional means for extracting and effectively utilizing energy generated by the expansion machine. In addition, the rotational energy obtained at the expansion turbine can be used to increase the hydrogen gas pressure at the compressor and to direct it to the turbine outlet so that the expansion ratio of the turbine can be increased by an increment commensurate with the pressure increased by the compressor, to eventually produce more heat drop (generated cold).

While the high-pressure hydrogen filling system with expansion turbine according to the present invention has been described above in conjunction with an exemplary embodiment, but the invention is not limited to the configuration depicted by the embodiment but can be altered to any configuration, as applicable, within the intent of the invention.

Feasibility of Industrial Use

The high-pressure hydrogen filling system with expansion turbine according to the present invention is simple in configuration, requires not much maintenance and control duties, is operable at low costs including electric power consumption cost, and has characteristics that permit the use of general-purpose materials for the components of the hydrogen gas supply unit, and therefore can be preferably used for a hydrogen precooling system designed to lower hydrogen gas temperature in the final filling section of a hydrogen station.

Explanation of Signs

1. Compressor equipment
2. Hydraulic hydrogen accumulator equipment
3. Expansion valve
4. Hydrogen gas precooler
5. Hydrogen precooling system
6. Fuel tank (tank)
7. Refrigerator equipment
8. Brine circuit
9. Hydrogen gas supply line
10. High-pressure hydrogen filling system with expansion turbine
11. Expansion turbine (Turbine compressor)
11a. Turbine
11b. Compressor
12. Cooler 12*a*. Cooling source
13. Hydrogen gas supply unit
14. Cold accumulator
14*a*. Pressure-resistant vessel
14*b*. Heat-insulating construction
14*c*1 to 14*c*3: Cold accumulator elements
15. Joint

The invention claimed is:

1. A high-pressure hydrogen filling system with an expansion turbine, and a cold accumulator comprising a pressure resistant vessel, the vessel containing and holding a cold accumulator element, is installed in a pipeline connected to an outlet of the expansion turbine in the hydrogen gas filling system for performing hydrogen gas enthalpy drop by using the expansion turbine.

2. The high-pressure hydrogen filling system with the expansion turbine of claim 1, wherein the cold accumulator element is a made of a metal of a ribbon scrub brush shape.

3. The high-pressure hydrogen filling system with the expansion turbine of claim 2, wherein the expansion turbine is a turbine compressor.

4. The high-pressure hydrogen filling system with the expansion turbine of claim 1, wherein the cold accumulator element is made of a hydrogen storage metal.

5. The high-pressure hydrogen filling system with the expansion turbine of claim 4, wherein the expansion turbine is a turbine compressor.

6. The high-pressure hydrogen filling system with the expansion turbine of claim 1, wherein the expansion turbine is a turbine compressor.

* * * * *